United States Patent
Beaurepaire et al.

(10) Patent No.: US 9,810,546 B2
(45) Date of Patent: *Nov. 7, 2017

(54) METHODS AND APPARATUS FOR NAVIGATIONAL ROUTING

(71) Applicant: HERE Global B.V., Veldhoven (NL)

(72) Inventors: Jerome Beaurepaire, Berlin (DE); Richa Menke, Berlin (DE)

(73) Assignee: HERE Global B.V., Eindhoven (NL)

( * ) Notice: Subject to any disclaimer, the term of this patent is extended or adjusted under 35 U.S.C. 154(b) by 42 days.

This patent is subject to a terminal disclaimer.

(21) Appl. No.: 14/977,790

(22) Filed: Dec. 22, 2015

(65) Prior Publication Data

US 2016/0131496 A1    May 12, 2016

Related U.S. Application Data (63) Continuation of application No. 13/419,769, filed on Mar. 14, 2012, now Pat. No. 9,285,226.

(51) Int. Cl.
*G01C 21/36* (2006.01)
*G01C 21/20* (2006.01)
*G01C 21/34* (2006.01)

(52) U.S. Cl.
CPC ......... *G01C 21/3667* (2013.01); *G01C 21/20* (2013.01); *G01C 21/3461* (2013.01); *G01C 21/3676* (2013.01); *G01C 21/3697* (2013.01)

(58) Field of Classification Search
CPC  G01C 21/20; G01C 21/3461; G01C 21/3667; G01C 21/3676; G01C 21/3697
USPC .................. 701/410–418, 533–534
See application file for complete search history.

(56) References Cited

U.S. PATENT DOCUMENTS

| | | | |
|---|---|---|---|
| 6,452,544 B1 * | 9/2002 | Hakala | G01C 21/20 342/357.31 |
| 8,332,180 B2 | 12/2012 | Partridge et al. | 702/150 |
| 9,285,226 B2 | 3/2016 | Beaurepaire et al. | |
| 2002/0128772 A1 | 9/2002 | Polidi et al. | 701/208 |

(Continued)

FOREIGN PATENT DOCUMENTS

| | | |
|---|---|---|
| EP | 1772705 A1 | 4/2007 |
| EP | 2825845 A2 | 1/2015 |

(Continued)

OTHER PUBLICATIONS

European Patent Office, Communication Pursuant to Rules 161(1) and 162 EPC for Application No. 13706992.8, dated Oct. 21, 2014, 2 pages, U.S.A.
International Searching Authority, International Search Report and Written Opinion for Application No. PCT/EP2013/053998, dated Oct. 14, 2013, 7 pages, European Patent Office, The Netherlands.

(Continued)

*Primary Examiner* — Nga X Nguyen
(74) *Attorney, Agent, or Firm* — Alston & Bird LLP (57) ABSTRACT

Systems and techniques for updated routing are described. A device computes a route from an origin to a destination and provides updated navigation information as a user travels along the route. In response to a change in orientation of the device, a display element is presented indicating the orientation of the device, allowing the user to enter an indication to compute an updated routing based on the orientation of the device. In one or more embodiments of the invention, a user may be presented with routing information such as time and distance information based on potential routing computed a detected orientation of an orientation detection device.

20 Claims, 12 Drawing Sheets

(56) References Cited

U.S. PATENT DOCUMENTS

| | | | |
|---|---|---|---|
| 2004/0122591 A1 | 6/2004 | MacPhail | 701/209 |
| 2008/0004803 A1 | 1/2008 | Kikuchi | 701/209 |
| 2009/0216434 A1 | 8/2009 | Panganiban et al. | 701/208 |
| 2010/0123737 A1 | 5/2010 | Williamson et al. | 345/672 |
| 2010/0318291 A1* | 12/2010 | Gluck | G01C 21/367 701/532 |
| 2011/0175751 A1 | 7/2011 | Khachaturian | 340/905 |
| 2012/0050144 A1 | 3/2012 | Morlock | 345/8 |

FOREIGN PATENT DOCUMENTS

| | | |
|---|---|---|
| GB | 2403008 A | 12/2004 |
| JP | 2009229205 | 8/2009 |
| WO | WO 2013/135488 A2 | 9/2013 |

OTHER PUBLICATIONS

The International Bureau of WIPO, International Preliminary Report on Patentability for Application No. PCT/EP2013/053998, dated Sep. 16, 2014, 11 pages, Switzerland.

U.S. Notice of Allowance for U.S. Appl. No. 13/419,769, dated Sep. 11, 2015, 9 pages, U.S.A.

U.S. Office Action for U.S. Appl. No. 13/419,769, dated May 23, 2013, 10 pages, U.S.A.

U.S. Office Action for U.S. Appl. No. 13/419,769, dated Dec. 24, 2013, 12 pages, U.S.A.

U.S. Office Action for U.S. Appl. No. 13/419,769, dated Aug. 28, 2014, 16 pages, U.S.A.

U.S. Office Action for U.S. Appl. No. 13/419,769, dated Apr. 1, 2015, 13 pages, U.S.A.

* cited by examiner

METHODS AND APPARATUS FOR NAVIGATIONAL ROUTING

CROSS-REFERENCE TO RELATED APPLICATIONS

This application claims priority as a continuation of co-pending U.S. application Ser. No. 13/419,769, filed on Mar. 14, 2012 and incorporated by reference herein in its entirety.

TECHNICAL FIELD

The exemplary and non-limiting embodiments of this invention relate generally to navigation devices. More particularly, the invention relates to improved techniques for determining a route in a navigation device.

BACKGROUND

One notable result of the continued miniaturization and widespread availability of electronic devices has been the availability of handheld mapping and direction finding devices. Many handheld navigation devices are available that allow a user to select an origin point and a destination point, with the device then plotting a route to the destination point. The origin point may be a user's location or some other origin point, and once the user has started on the route, the device is able to show the user his or her position on the route and various factors relating to progress along the route.

SUMMARY

According to one embodiment of the invention, an apparatus comprises at least one processor and memory storing computer program code. The computer program code is configured to, with the memory and the at least one processor, cause the apparatus to perform actions comprising at least identifying an origin and a destination for navigation, receiving an input from a user directing computation of a route to the destination, determining orientation information based on the user input and, upon determining the orientation information, computing the route to the destination comprising a portion lying in a direction of an orientation indicated by the orientation information.

According to another embodiment of the invention, a method comprises configuring at least one processor to cause an apparatus to perform actions comprising at least selecting an origin and a destination for navigation, detecting an orientation of a navigational device, and computing a first route to the destination, comprising a portion lying in a direction of the orientation of the device.

According to another embodiment of the invention, a computer readable medium stores a program of instructions. Execution of the program of instructions by a processor configures an apparatus to perform at least identifying an origin and a destination for navigation, receiving an input from a user directing computation of a route to the destination, determining orientation information based on the user input and, upon determining the orientation information, computing the route to the destination comprising a portion lying in a direction of an orientation indicated by the orientation information.

In another embodiment an apparatus comprises at least one processor and memory storing computer program code. The computer program code is configured to, with the memory and the at least one processor, cause the apparatus to perform actions comprising at least identifying a geographic location, receiving orientation information based on a user input and, upon determining that the geographic location is more than a specified distance from a nearest street, identifying a street nearest the identified geographic location and in a direction indicated by the orientation information.

These and other embodiments and aspects are detailed below with particularity.

DETAILED DESCRIPTION

Embodiments of the present invention recognize that particularly in the case of handheld navigational devices used by pedestrians, a user may wish to change a route once he or she has begun traveling the route. In particular, a user may wish to change a routing to a destination, or explore the effects of changing the routing, without changing the destination. One or more embodiments of the invention, therefore provide simple, intuitive mechanisms that allow a user to propose or enter such changes in routing. In one or more embodiments of the invention a user may point a device in a desired alternative direction and receive information about a routing passing through the alternative direction, such as the time and distance to the destination following the alternative routing versus the time and distance following the original routing. In one or more further embodiments of the invention, the device may simply present information relating to the difference between an original route and a possible alternative route, such as that the alternative route would be estimate to take 5 minutes longer than the original route, or that the alternative route cannot lead to the destination—for example, because it is initiated at a dead-end street. Embodiments of the present invention provide mechanisms to calculate routes without, for example, manually selecting a waypoint or dragging an existing route, or actually walking along a contemplated new route until a device recalculates the route.

Figure 1:
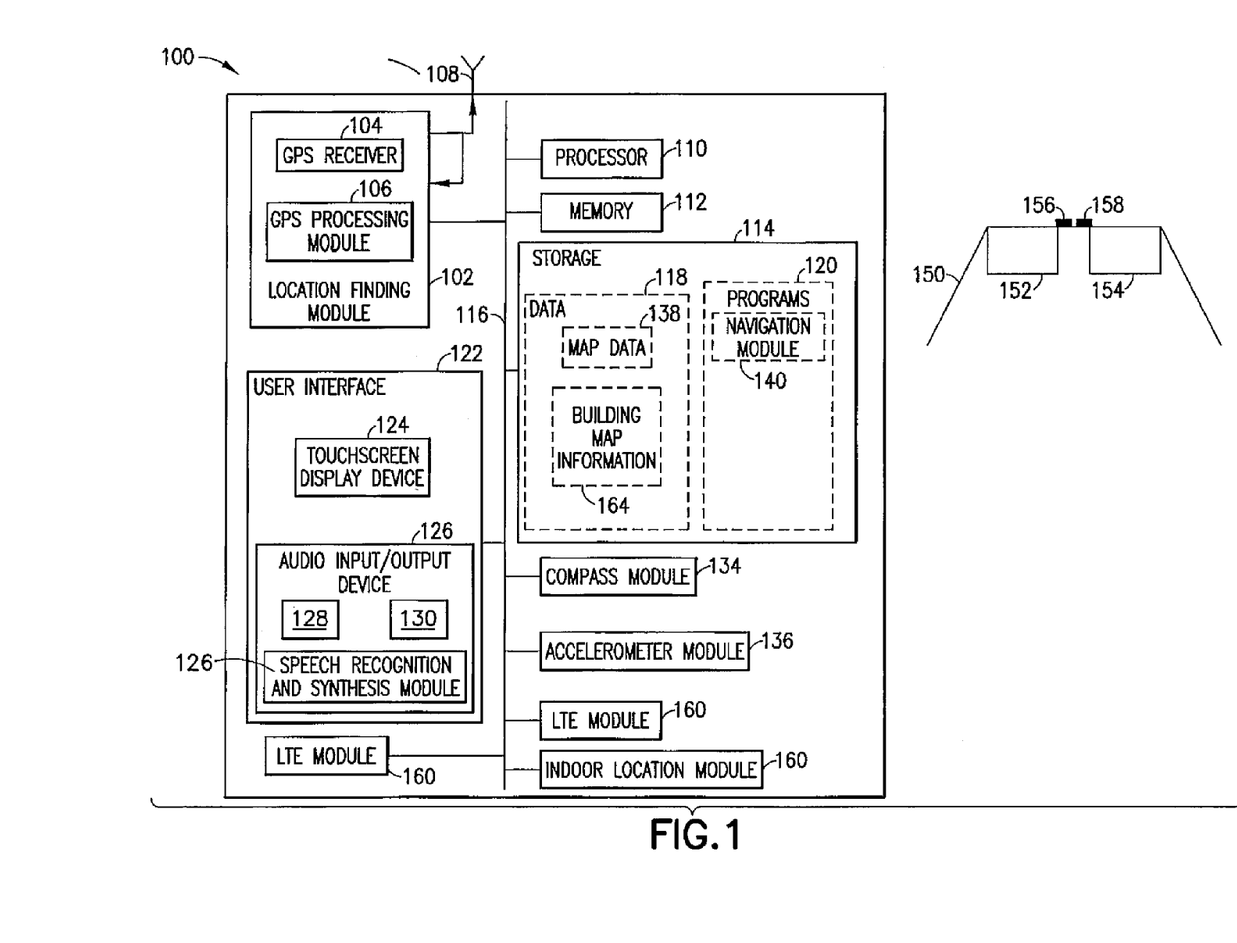
FIG. 1 illustrates a device according to an embodiment of the invention.

FIG. 1 illustrates a navigational device 100 according to an embodiment of the present invention. For simplicity, the navigational device 100 is presented here as a device directed only to routing and navigation. It will, however, be recognized that many multipurpose devices, such as wireless communication devices operating in systems such as long term evolution (LTE) wireless networks provide navigational capabilities using both self-contained map and navigational data and data gathered through the communication capabilities of the device. Embodiments of the present invention may be easily be adapted for use in devices that provide navigational services, whether or not these devices provide additional services as well.

The device 100 comprises a location finding module 102, which may include a global positioning system (GPS) receiver 104, GPS antenna 106, and GPS processing module 108, which manages the operation of the GPS receiver 104 and processes the data received therefrom to identify the location of the GPS receiver 104, which naturally is the same as the location of the device 100. The device 100 further includes a processor 110, memory 112, and storage 114, communicating with one another and with the GPS processing module 108 over a bus 116. The device 100 farther employs data 118 and software 120, suitably residing in storage 114 and transferred to memory 112 as needed for use by the processor 110. The storage 114 and the memory 112 may comprise any suitable memory device or devices, and it will be recognized that the use of the different terms "storage" and "memory" is non-limiting. The software may comprise one or more programs of instructions executable by a processor. The device 100 also suitably comprises a user interface 122, which in some embodiments comprises a touchscreen display device 124. It will be recognized, however, that a touchscreen display is not necessary to the operation of the invention, and that numerous mechanisms for presenting information to the user and receiving inputs from the user may be employed. For example, manual inputs and display may be accomplished using separate input and display devices. Alternatively or in addition, the user interface 122 may comprise an audio input/output device 126, comprising a microphone 128 and speaker 130, and using a speech recognition and synthesis module 132. The speech recognition and synthesis module 132 may suitably be implemented as part of the software 120. The user interface 122 may also be considered to include devices detecting movements and changes in orientation of the device 100, because such movements and changes may occur as purposeful user inputs. The devices may, for example, include a compass module 134 and an accelerometer module 136, comprising one or more accelerometers. It will be recognized that the outputs of devices such as the compass module 134 and the accelerometer module 136 may be put to numerous purposes, including purposes other than recognizing user inputs, and it is only for convenience that these devices are here presented as being part of or associated with the user interface 122.

The data 118 may suitably include map data 138 as part of the data 118, and a navigational module 140 as part of the software 120. The navigational module 140 gathers relevant data from the map data 138, as well as location information from the location finding module 102, to present a display to the user. The user is able to enter commands and make selections using the user interface 122, and the navigational module 140 processes the commands and selections and any other user inputs, map data, and location data to present updated map and routing data. Such data may be presented, for example, using the touch screen display 124, the audio input/output device, or both. Routing data may include route origin and destination points, position of the user along the route, distance from origin to destination, distance traveled, time on route, estimated total time and remaining time to destination, and any other relevant information. The navigational module 140 may provide any of a number of mechanisms to allow a user to set an initial route. For example, an origin point may be selected by a search, by automatic recognition of the current location of the device, by selection of a point on a map display followed by confirmation, or by any number of alternative mechanisms. The destination point may be selected by a desired mechanism, and the user may also establish waypoints along the route. The user may then begin to navigate along the route, with the device 100 providing directional information, such as instructions to turn left or right, to walk along one street or another, or, once the destination has been reached, to stop.

In addition to providing mechanisms for establishing and navigating along a route, the navigational module 140 allows a user to change the route by simple and intuitive actions, employing the user interface 122 or taking advantage of other characteristics of the device 100.

The accelerometer module 136 may be used to recognize user actions such as tilting of the device 100. For example, the accelerometer module 136 may detect a tilting action and provide data indicating detection of the tilting action. The navigational module 140 may be configured to perform appropriate actions in response to the data provided by the accelerometer. Such actions may include any appropriate action that may be based on recognition of a deliberate user action, such computation or display of a route, display of information. In some embodiments of the invention, recognition of appropriate accelerometer data may be treated as a user confirmation, allowing a user to direct entry of a suggested command by tilting or otherwise moving the device.

It will be further recognized that while the device 100 is presented here as a handheld device, many other embodiments may be contemplated. For example, one or more embodiments of the invention may comprise a wearable device 150, for example in the form of goggles. The wearable device 150 may comprise one or more display devices 152 and 154 similar to the display device 122, and may include a compass module 156 similar to the compass module 134 and an accelerometer module 158 similar to the accelerometer module 136, so that a user could be presented with route selections and select or confirm commands by simple movements. For example, a user might look down a street. The device would detect a change in orientation and present a possible route, and the user could then confirm selection of the route by nodding his or her head, causing an accelerometer to recognize tilting of the device. A wearable device such as the device 150 is particularly useful in cases in which a user's hands are occupied, such as bicycling or motorcycling. As noted above, user inputs need not be manual inputs, and a device such as the device 150 can be easily configured to develop a route and change the route if need be without using his or her hands to manipulate the device. For example, a user can select origin and destination locations through spoken commands, and can easily initiate or change routing by changing the orientation of the device.

A single device 100 has been presented here for simplicity, but it will be recognized that various functions may be separated. For example, in the case of a wearable device, it may be desired to implement detection of orientation and user actions indicating confirmation, but not to display routing using the wearable device. Alternatively or in addition, the wearable device 150 or a similar device might not comprise display devices such as the display devices 152 and 154. A wearable device may simply comprise a compass module, an accelerometer module, or both, and may be connected wirelessly or by wire to a device such as the device 100, so that when the wearable device is so connected, the device 100 will receive the inputs provided by the wearable device, but when the wearable device is not connected, the device 100 may take orientation and other movement information from its own orientation and movements. A user might, for example, turn his or her head in a direction of a possible route, and information relating to the movement might be detected by a wearable device such as the device 150 and delivered to the device 100.

It will further be recognized that devices such as the device 100 and the device 150 may obtain location information from numerous sources other than or in addition to the global positioning system. For example, if the device 100 is implemented as a user device or user equipment (UE) in a wireless cellular system, the device 100 may comprise a long term evolution (LTE) module 160 that communicates with base stations and may compute approximate location information from such communication. In addition, the device 100 may comprise an indoor location module 162. The indoor location module 162 may be configured to receive local short-distance broadcasts of location information inside a building. For example, a building may deploy transmitters sufficiently numerous to allow properly equipped devices within the building to determine their location within the building. The indoor location module 162 may, for example, have access to stored building map information 164 or may receive such information as part of a broadcast by transmitters within the building. Location information provided by indoor location module 162 might be used in finding a route through a building, particularly to an emergency exit from a building in the case of an emergency. For example, a user may enter an input indicating a desire to exit in case of an emergency, or a signal broadcast by the building and received and interpreted by the indoor location module 162 may include an evacuation indicator, causing the device 100 to display an exit route. In less urgent circumstances, a user may simply enter an input indicating a desire for guidance in exiting or navigating through a building.

The navigation module 140 may present a route to an exit of the building, or to another destination of the building, and may receive and interpret orientation information in the same manner as described above in connection with outdoor navigation. For example, in the case of an emergency evacuation, a user may come to an impassable pathway and may point the device 100 in a different direction to cause calculation of an alternative route. The device 100 may calculate the route or may present a notification that no route is available in the direction indicated, allowing the user to point the device in a further different direction and attempt to calculate a route in that direction.

The device 100 may also have access to public transport information, which may be stored or may be accessible, for example, through the LTE module 160. The navigation module 140 is able to examine such public transport information, and either the public transport information or the map data 138. The navigation module 140 may be configured to recognize from a combination of orientation information and location information that a user wishes to use public transportation as part of a route, and design a route including the use of public transport as part of the route. For example, if a user is near a subway station and points the device 100 downward, or is near a bus stop and points the device 100 at a bus stop shelter, the navigation module 140 may recognize that the user wishes to use public transport beginning at the indicated stop, and compute a route accordingly. However, depending on the particular circumstances, the navigation module may compute and present a different route. For example, if an express bus stop is nearby, but only a local bus stops at the user's location, the navigation module 140 may compute and present a route requiring the user to walk to the express bus stop in order to take advantage of a faster route.

Figure 2A:
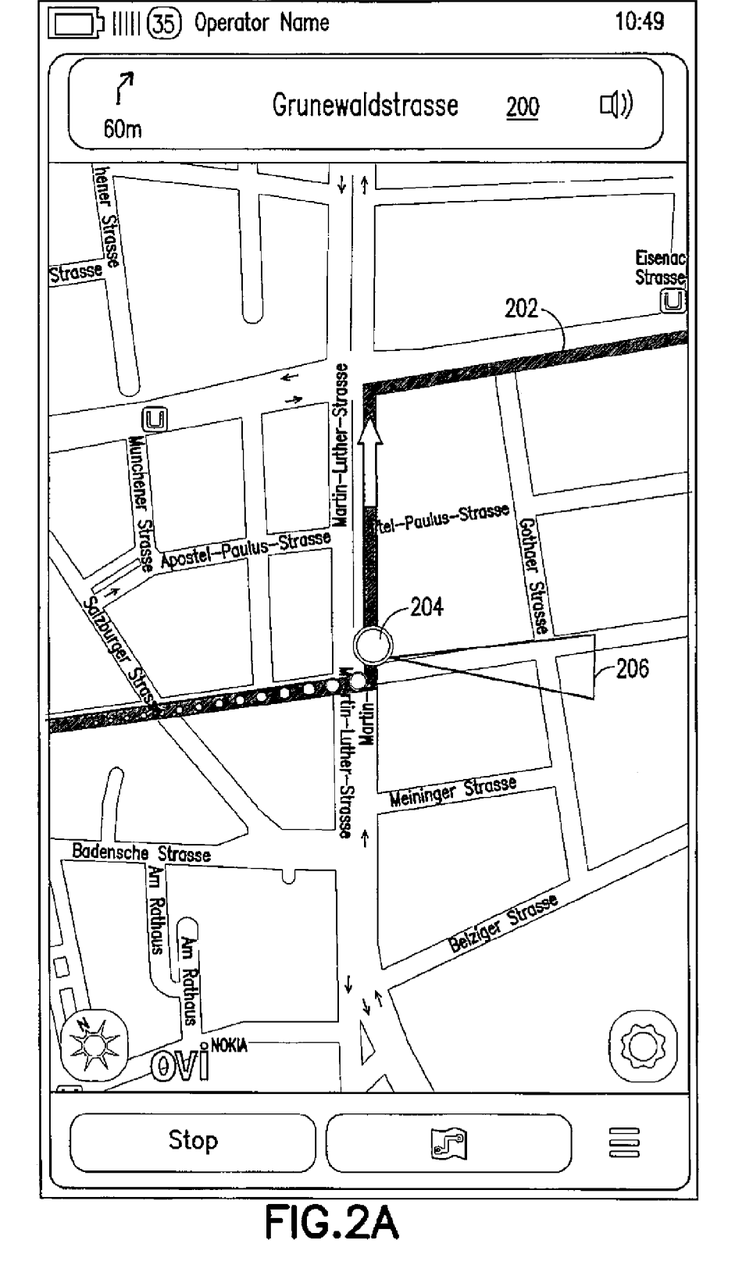
FIGS. 2A-2D illustrate successive stages of updated route computation according to an embodiment of the invention.

FIGS. 2A-2D illustrate a sequence of operations performed using the display device 124 in order to recalculate a route from an origin to a destination along a new routing. FIG. 2A illustrates a display 200 presented by the display device 124, showing a portion 202 of a route that was previously calculated by the device 100. The symbol 204 illustrates the current location of the device 100, and a beacon 206 extends from the symbol in the geographical direction toward which the device 100 is oriented. In the present exemplary case, the device 100 is oriented in an easterly direction, so that the beacon 206 extends in that direction. The beacon 206 intersects a street 208, so that the beacon extends in a navigable direction.

Figure 2B:
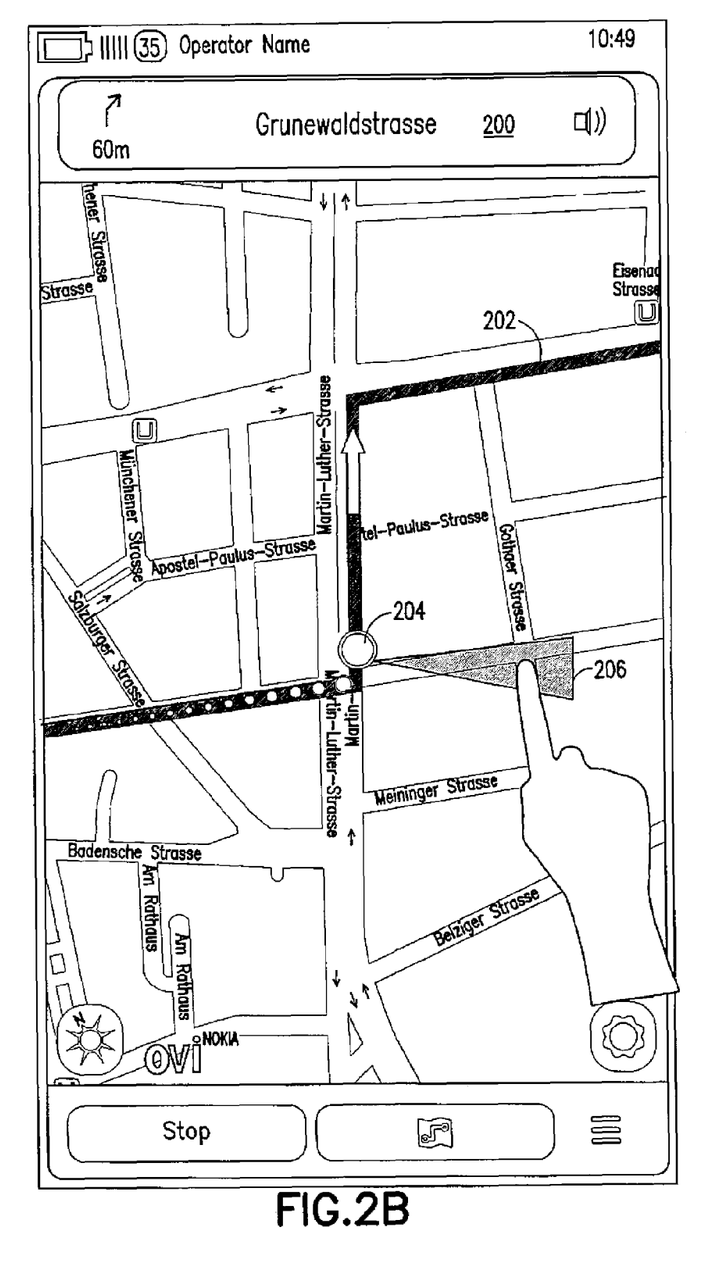
Figure 2C:
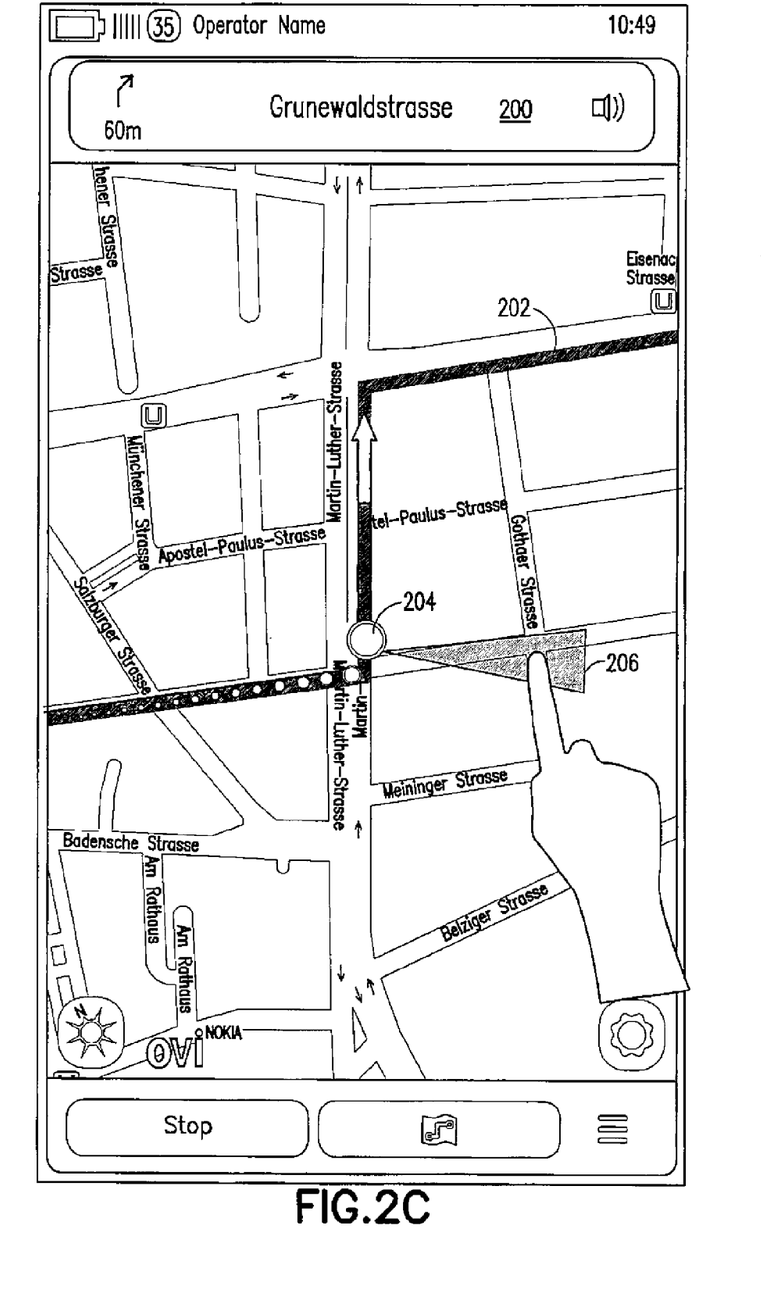

FIG. 2B illustrates the display 200 as it presents an indication that a selection of an alternative routing is underway. In the present example, a user is touching the display device 124 at the beacon 206, indicating a desire to perform a route computation in the direction in which the beacon 206 is pointing. The beacon 206 has changed in appearance, indicating that the user input has been noted. FIG. 2C illustrates the display 200 as the navigation module 140 continues to process the user input. The beacon 206 has further changed in appearance, indicating that the user input has been accepted and that the rerouting is being processed.

The navigation module 140 may process possible alternative routings in a number of ways. For example, in the case being illustrated here, the beacon 206 encompasses a street, so that the beacon 206 is clearly pointing in a navigable direction. In one embodiment of the invention, the navigation module 140 may evaluate the nature of the element to which the beacon 206 is directed. For example, if the beacon 206 is not pointing along a street, a user input indicating a desire to reroute may be rejected. Such a situation may arise, for example, when the beacon is pointing at a corner or perpendicularly at a street, rather than along a street, so that actual direction indicated by the beacon is ambiguous or unnavigable. In another alternative embodiment, the navigation module 140 may calculate an optimum alternative route using a navigable point intersected by the beacon 206 even if the beacon 206 does not lie along a navigable path. In another embodiment, if the beacon 206 does not intersect a navigable point, the navigation module 140 may select a navigable point near the point intersected by the beacon 206 and use the selected point as an entry point to an optimum alternative route.

It will also be recognized that a user may use a device such as the device 100 when away from any streets. In some such cases a user may wish not to reach a particular specified destination, but may wish instead simply to get back to a street. Therefore, in one or more embodiments of the invention, the navigation module 140 may use orientation information not to calculate a route but to determine information useful for reaching a street. Such information may include distance and direction, and may take into account the presence of obstacles. As a user holds the device 100 and turns in a circle or part of a circle, the navigation module 140 may receive the orientation information indicating such turning, and may identify the street nearest to the user. The navigation module 140 may, if so configured, ignore streets to which a user's path is blocked by an obstacle, and may, alternatively or in addition, identify alternative streets which may be farther away but to which the user's path is not blocked. If it is so configured, the navigation module 140 may ignore streets to which the user's path is blocked, and instead identify and present distance and direction information to the nearest reachable street. As the user turns, the navigation module 140 may identify each street toward which an orientation detection device is directed—for example, the compass module 134 of the device 100. Once the user is no longer turning, the navigation module 140 may cause selection and presentation of information for the nearest street, the first two or three nearest streets, the nearest or first two or three nearest reachable streets, or any other suitable information desired. The user need not turn in a complete circle, and the cessation of orientation changes may be recognized as indicating a desire for presentation of information based on the choices that have already been identified.

Figure 2D:
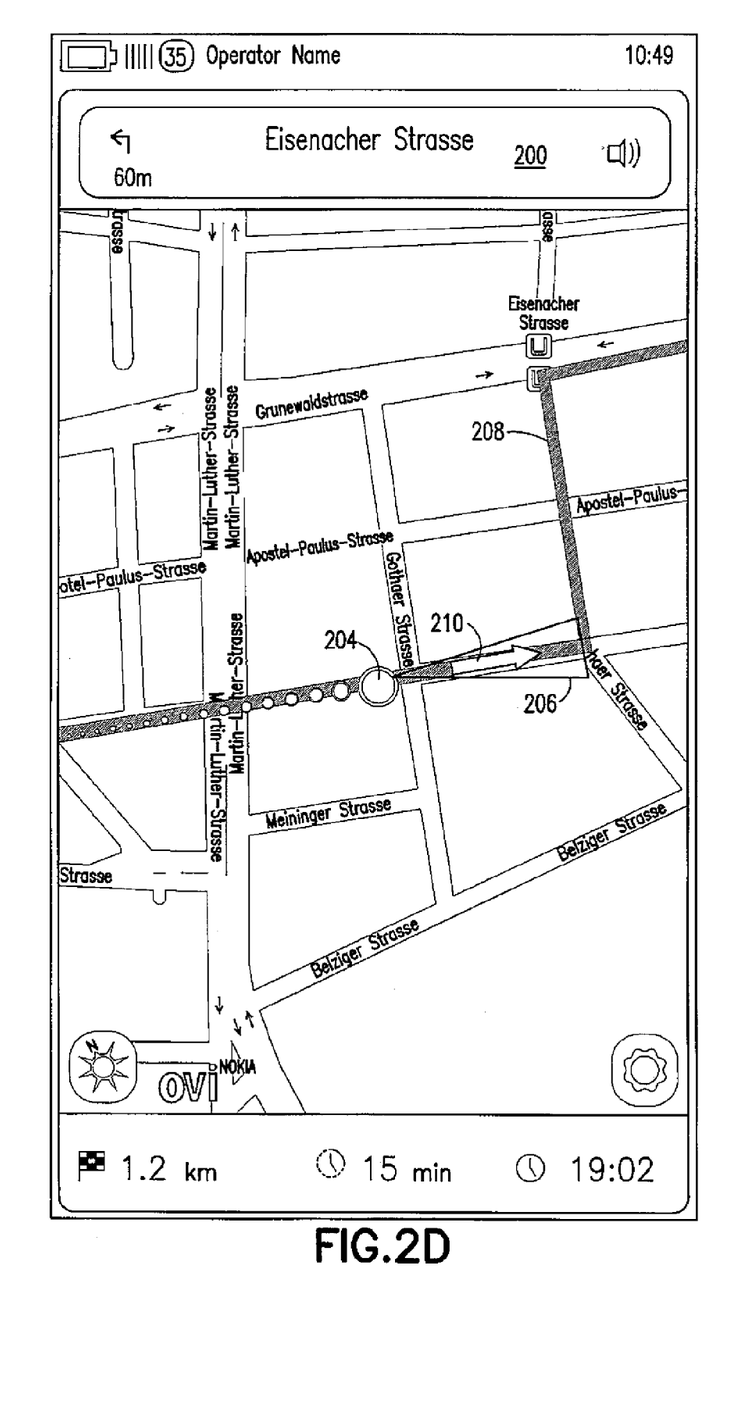

FIG. 2D illustrates the display 200 after the user input has been accepted and processed and a new route 208 has been calculated. The user has proceeded some distance along the recalculated route and the beacon 206 points directly along the route. In addition, an arrow 210 can be seen indicating the direction along the route. It can be seen that the route 208 takes a left turn and then takes a right turn to rejoin the original route, because such a routing is optimal after the requirement to proceed in the indicated direction has been met. If the user wishes to continue in his or her present direction, it is a simple matter to orient the device 100 to indicate the desired direction and make another selection to force another rerouting. Numerous mechanisms might be used to make the selection, such as tilting the device, or an audio command. In addition, it will be recognize that the navigation module 126 might require a specific indication before presenting the beacon 206, in order to avoid clutter on the display 200. In addition, a route reversal may also be tentatively recognized and then confirmed by the user when a change in orientation of 180 degrees or thereabouts is detected. Such a route reversal may involve not the calculation of routing to the original destination, but instead may comprise selection of the point of origin as a destination and compute a route from the current position to the origin. The reversal may be confirmed only upon a user selection.

Figure 3:
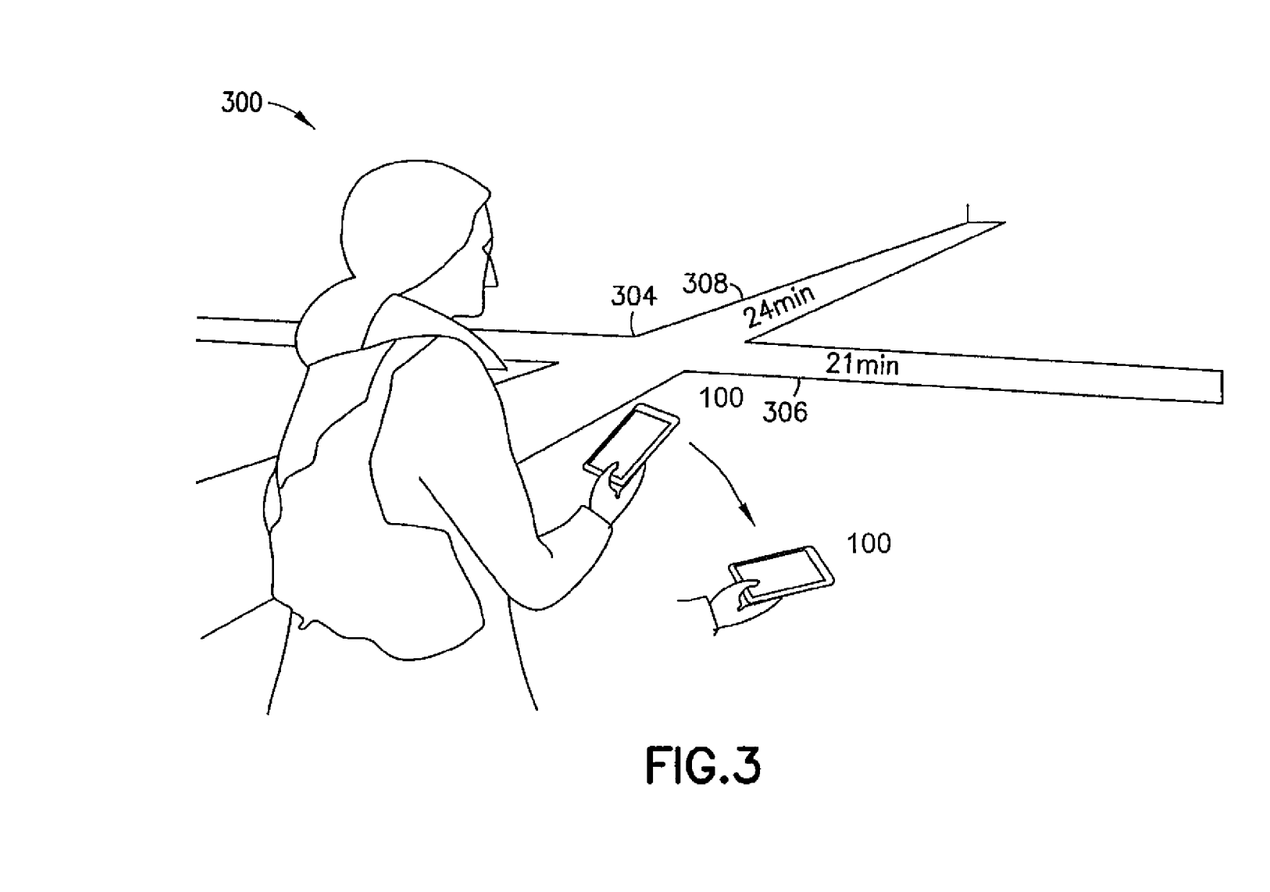
FIG. 3 illustrates the presentation to a user of route information for routes determined according to an embodiment of the present invention.

According to one or more alternative embodiments of the invention, a user is able to evaluate alternative possible routings by pointing the device 100 in differing directions and seeing information relating to a potential routing in each direction. For example, FIG. 3 illustrates a user 300 holding a device such as the device 100. The user has selected a destination, but has not yet decided which routing to follow. The user is facing an intersection 304 between roads 306 and 308. The user can see that she will take 21 minutes to reach her destination by following a route that begins along the road 306 and will take 24 minutes to reach her destination by following a route that begins along the road 308. In the case of the device 100, the compass module 134 provides information that can be used by the navigation module 140 to determine the orientation of the device, and the navigation module 140 can use the orientation information together with the map data 138 to identify the road at which the user is pointing, and can perform routing calculations to identify a proposed route in order to deliver information about the route to the user. Such routing calculations can be performed without immediately selecting or displaying the route determined by the calculation as the route to be followed, and may instead simply present desired information such as time or distance information. Once the user is aware of this information, she may ignore the information, or may take appropriate actions to actually replace the original route with the new one.

If desired, a device such as the device 100 might operate in modes in which the routing is suspended whenever an intersection is reached, so that the user may evaluate potential routings. Such a mode might be a "stroll mode" or a "tourist mode", employed when a user is not particular about arriving at a destination at any specific time. If desired, the user might not choose to look at the actual routing, but might instead simply evaluate a direction at each intersection based on criteria such as that the routing along one road is shorter, or that the routing is not excessively longer along a street exhibiting sights in which the user is interested. If desired, the computation of, and presentation of information relating to, a potential routing may be performed only upon a user selection.

At any time, the user may view the routing that has been calculated to furnish the time information or other information by which the user chooses directions. The user may then select a route to be followed unless a new selection is actively made.

It will be recognized that the calculation of an alternative route, and not merely the viewing of the route, might depend on a user selection or other predetermined circumstances. For example, a user might tilt the device 100 or touch the display device 124 or give an audio command, and the navigation module 140 might then calculate the new route and present relevant information such as comparative travel times and distances, but still might not yet display the new route. The new route might be displayed upon a further command.

Figure 4A:
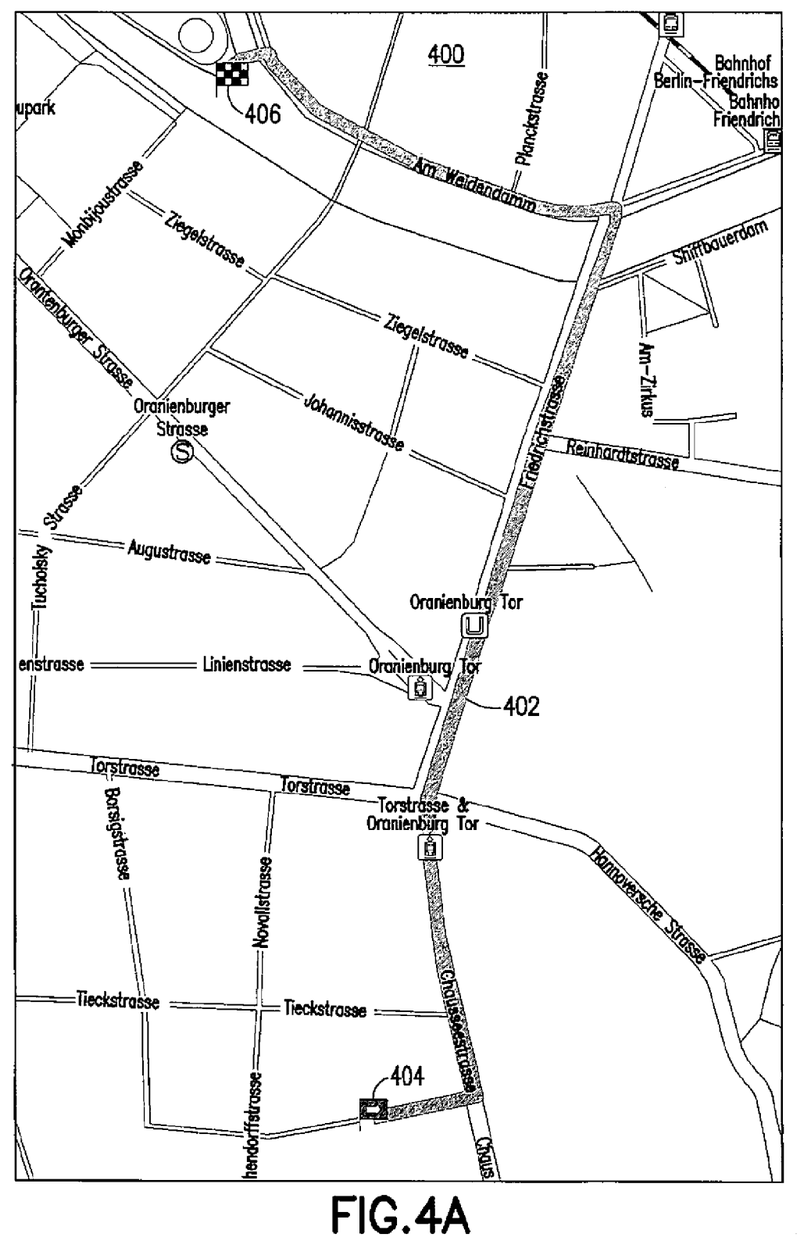
FIGS. 4A and 4B illustrate stages of route computation according to an embodiment of the present invention.
Figure 4B:
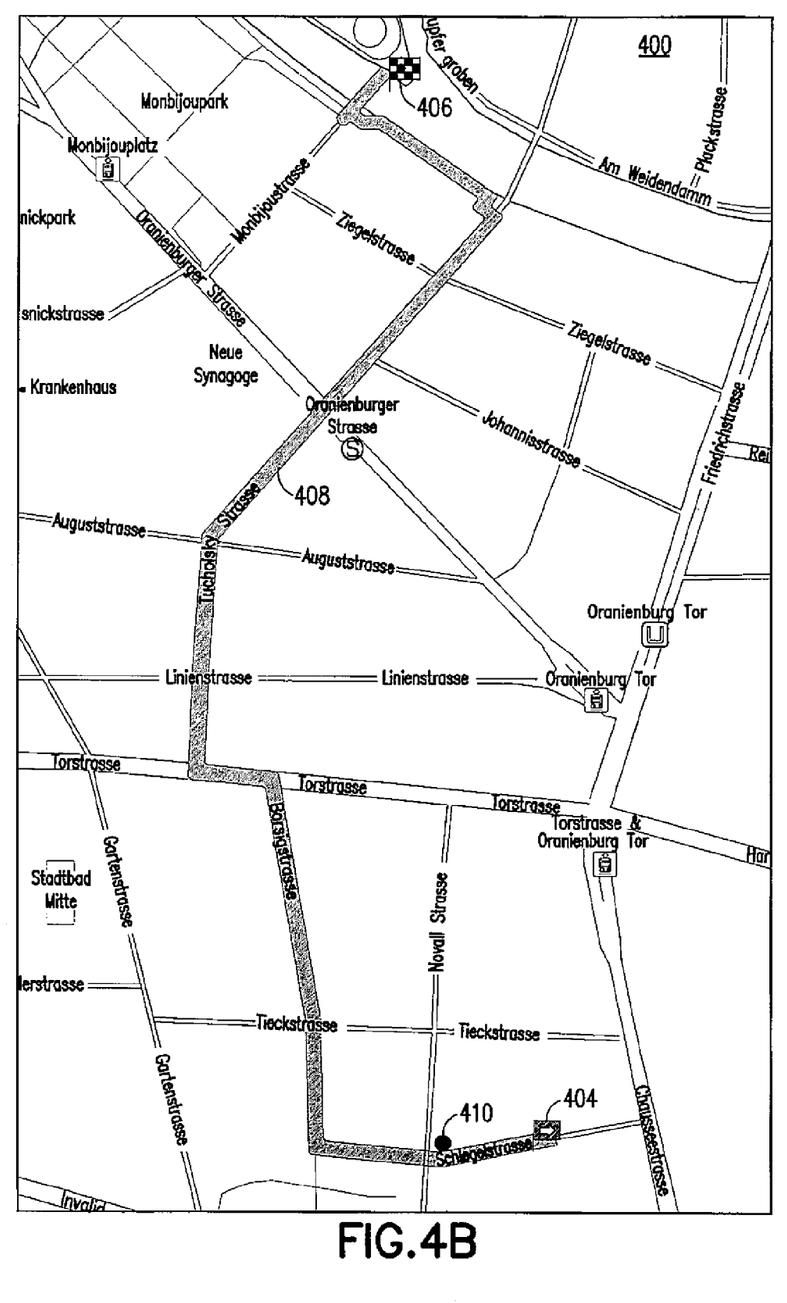

FIGS. 4A and 4B illustrate alternative routings calculated in response to different orientations of a device such as the device 100. Each of the alternative routings may be presented, for example upon a user selection to display a route that has been computed in order to provide information relating to the route, such as time or distance information.

FIG. 4A illustrates a display 400 showing a routing 402, from an origin point 404 to a destination point 406. The routing 402 may be calculated upon detection of an orientation of a device such as the device 100 in the easterly direction shown as the beginning of the route and displayed under appropriate circumstances. FIG. 4B illustrates a display 400 showing an alternative routing 408, from the origin point 404 to the destination point 406. This routing 408 is calculated in response to detection of orientation of the device in the direction 410. Calculation of the route may comprise, for example, setting of a waypoint at the next intersection toward which the device is oriented. For example, the device may be pointing directly at the intersection, or may be pointing along a street that leads to an intersection, with this intersection being used as the waypoint. Such waypoint selection may be invisible to a user.

As an alternative, pointing along a street in a particular direction might force selection of an immediate segment to be used for calculation of a new route.

Figure 5A:
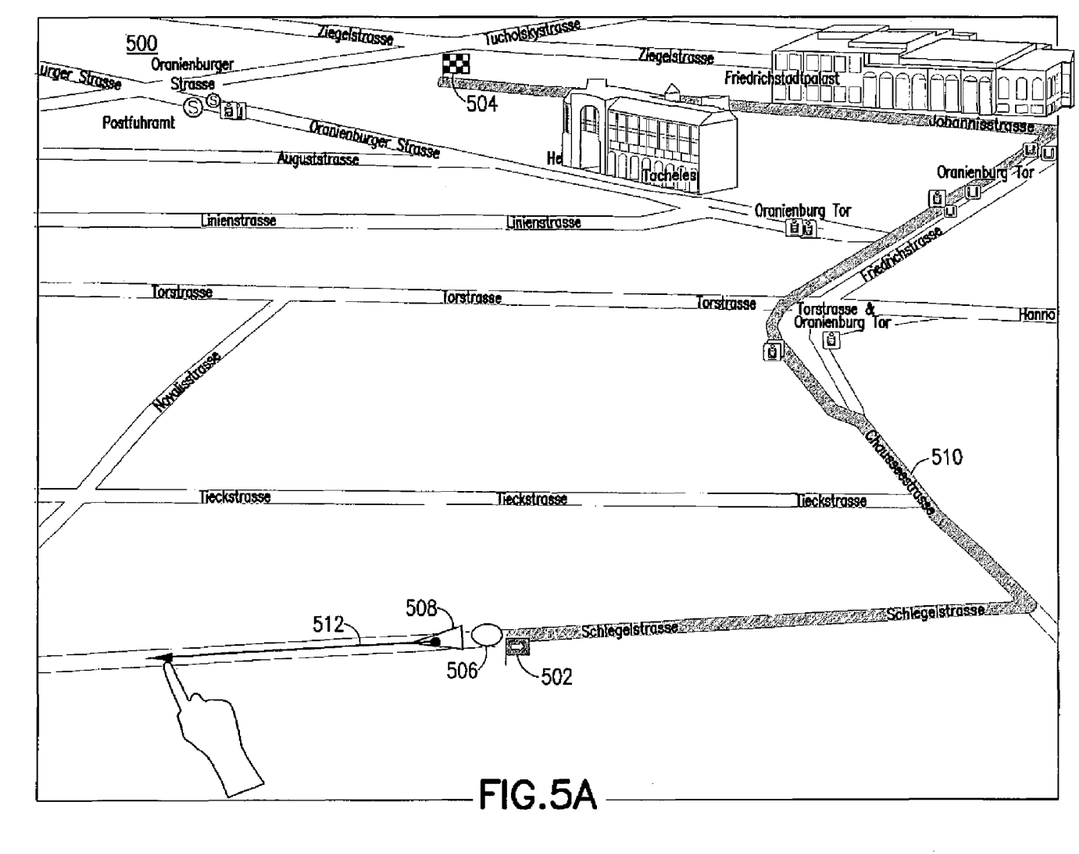
FIGS. 5A and 5B illustrate stages of route computation according to an embodiment of the present invention.
Figure 5B:
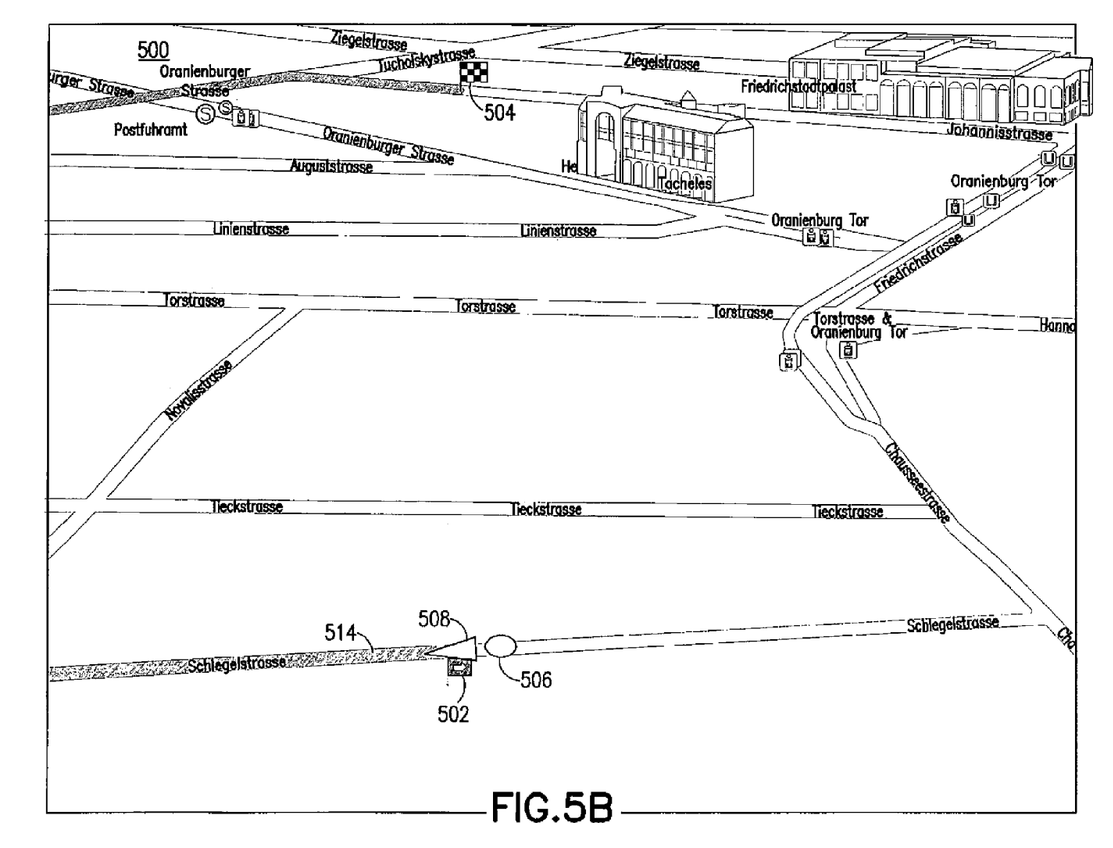

FIGS. 5A and 5B illustrate a change from an existing routing to a new routing. FIG. 5A illustrates a display 500, showing an origin 502 and a destination 504. The point 506 shows a location of the device presenting the display 500, and the pointer 508 shows the orientation of the device. The route 510 has been previously calculated, and the arrow 512 extends in the direction indicated by the 510, upon a touch indicating a desire by a user to recompute a route. FIG. 5B illustrates the display 500, showing the origin 502, the destination 504, the point 506, and the pointer 508. The visible portions of the recomputed route 514 are also shown, with portions of the route 514 being currently out of the displayed area.

Figure 6:
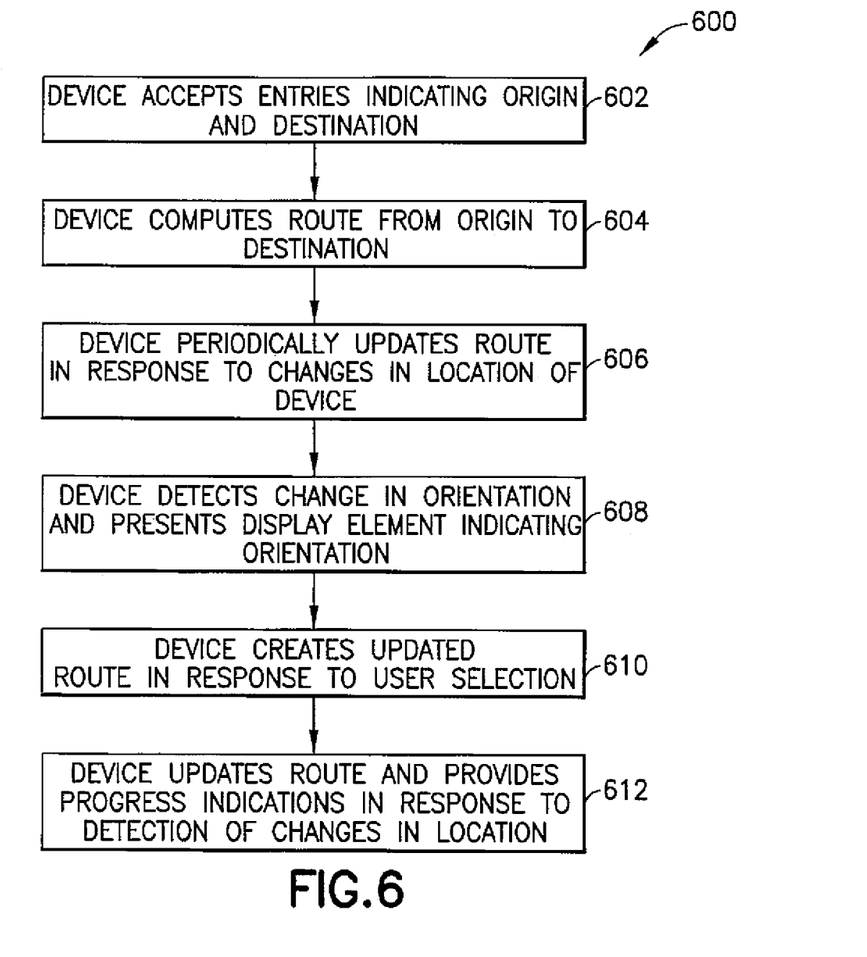
FIG. 6 illustrates a process according to an embodiment of the present invention.

FIG. 6 illustrates a process 600 of route computation according to an embodiment of the present invention. At step 602, a device accepts entries from a user indicating an origin and a destination. At step 604, the device computes a route from the origin to the destination. At step 606, the device periodically updates the route in response to detection of changes in the location of the device.

At step 608, the device detects a change in orientation and presents a display element indicating the orientation of the device. At step 610, upon an indication by a user to create an updated route along the direction indicated by the display element, the device creates the updated route. At step 612, the device updates the route and provides indications of progress along the route as it detects changes in location.

Figure 7:
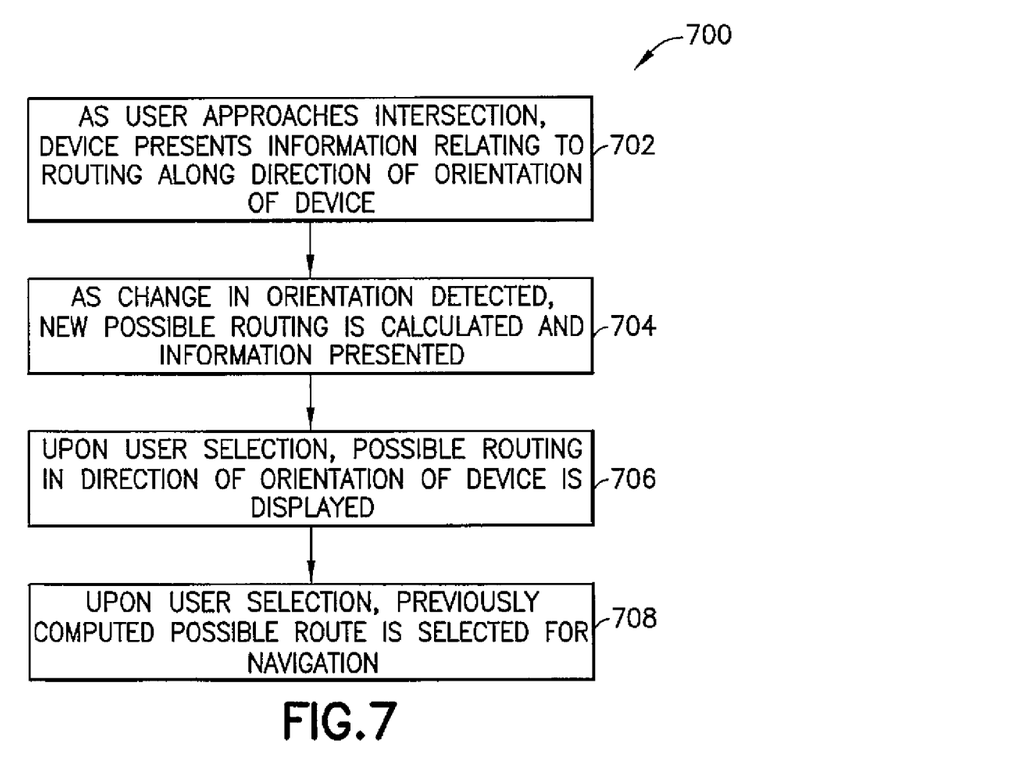
FIG. 7 illustrates a process according to an embodiment of the present invention.

FIG. 7 illustrates a process 700 of providing comparative routing information according to an embodiment of the present invention. At step 702, as a user approaches an intersection of two possible paths, a device presents information relating to a routing including a portion along a direction of the orientation of the device. The information may include distance to destination, estimated time to destination, or other appropriate information. At step 704, as a change in orientation of the device is detected, a new possible routing is calculated and information is presented relating to the new possible routing. At step 706, upon a user selection, a possible routing in a direction of the orientation of the device is displayed, with the display changing as appropriate with changes in orientation. At step 708, upon a user selection, a possible route computed in response to a detection of orientation of the device is selected for navigation.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
at least one processor; and
memory storing computer program code;
wherein the computer program code is configured to, with the memory and the at least one processor, cause the apparatus to perform actions comprising at least:
identifying an origin and a destination for navigation;
receiving an input from a user directing computation of a route to the destination;
determining orientation information based on signals from an orientation detection device whose orientation is directed by the user, wherein the signals from the orientation detection device indicate orientation of the orientation detection device; and
in response to determining the orientation information, computing the route to the destination, wherein computing the route comprises setting an intermediate street segment, the intermediate street segment lying along a direction indicated by the orientation, and computing a new route passing along the intermediate street segment to the destination.

2. The apparatus of claim 1, wherein the actions further comprise presenting a display to a user indicating the orientation of the orientation detection device and wherein computing the route is performed in response to receiving the user after presentation of the display.

3. The apparatus of claim 1, wherein the actions further comprise presenting to the user an estimate of the estimated time required to follow the route.

4. The apparatus of claim 1, wherein the actions further comprise presenting to the user an indication of the distance from the origin to the destination of the route.

5. The apparatus of claim 1, wherein the actions further comprise displaying the route to the user in response to selection by the user.

6. The apparatus of claim 1, wherein the actions further comprise selecting the route for navigation in response to a selection by the user.

7. The apparatus of claim 6, wherein the actions further comprise receiving location information and computing and presenting updated location information as the apparatus moves from one location to another.

8. A method comprising:
configuring at least one processor to cause an apparatus to perform actions comprising at least:
identifying an origin and a destination for navigation;
receiving an input from a user directing computation of a route to the destination;
determining orientation information based on signals from an orientation detection device whose orientation is directed by the user, wherein the signals from the orientation detection device indicate orientation of the orientation detection device; and
in response to determining the orientation information, computing the route to the destination, wherein computing the route comprises setting an intermediate street segment, the intermediate street segment lying along a direction indicated by the orientation, and computing a new route passing along the intermediate street segment to the destination.

9. The method of claim 8, wherein the actions further comprise presenting a display to a user indicating the orientation of the orientation detection device and wherein computing the route is performed in response to receiving the user input after presentation of the display.

10. The method of claim 8, wherein the actions further comprise presenting to the user an estimate of the estimated time required to follow the route.

11. The method of claim 8, wherein the actions further comprise presenting to the user an indication of the distance from the origin to the destination of the route.

12. The method of claim 8, wherein the actions further comprise displaying the route to the user in response to selection by the user.

13. The method of claim 8, wherein the actions further comprise selecting the route for navigation in response to a selection by the user.

14. The method of claim 13, wherein the actions further comprise receiving location information and computing and presenting updated location information as the orientation detection device moves from one location to another.

15. A non-transitory computer readable medium storing a program of instructions, execution of which by at least one processor configures an apparatus to perform actions comprising at least:
identifying an origin and a destination for navigation;
receiving an input from a user directing computation of a route to the destination;
determining orientation information based on signals from an orientation detection device whose orientation is directed by the user, wherein the signals from the orientation detection device indicate orientation of the orientation detection device; and in response to determining the orientation information, computing the route to the destination, wherein computing the route comprises setting an intermediate street segment, the intermediate street segment lying along a direction indicated by the orientation, and computing a new route passing along the intermediate street segment to the destination.

16. The computer readable medium of claim 15, wherein the actions further comprise presenting a display to a user indicating the orientation of the orientation detection device and wherein computing the route is performed in response to receiving the user input.

17. The computer readable medium of claim 15, wherein the actions further comprise presenting to the user an estimate of the estimated time required to follow the route.

18. The computer readable medium of claim 15, wherein the actions further comprise presenting to the user the distance from the origin to the destination of the route.

19. The computer readable medium of claim 15, wherein the actions further comprise displaying the route to the user in response to selection by the user.

20. The computer readable medium of claim 15, wherein the actions further comprise receiving location information and computing and presenting updated location information as the apparatus moves from one location to another.

* * * * *